US006084870A

United States Patent [19]

Wooten et al.

[11] Patent Number: 6,084,870

[45] Date of Patent: Jul. 4, 2000

[54] METHOD AND APPARATUS FOR THE REMOTE MONITORING AND CONFIGURATION OF ELECTRONIC CONTROL SYSTEMS

[75] Inventors: Kathleen R. Wooten; Thomas F. Doyle; Marie Bjerede; Marshall Hurst, all of San Diego, Calif.

[73] Assignee: Qualcomm Incorporated, San Diego, Calif.

[21] Appl. No.: 08/681,342

[22] Filed: Jul. 22, 1996

[51] Int. Cl.[7] .......... H04J 3/24

[52] U.S. Cl. .......... 370/349; 370/315; 340/459; 340/425.5; 340/525; 455/12.1

[58] Field of Search .......... 370/346, 349, 370/315, 316, 327, 449; 340/825.08, 825.52, 825.5, 459, 525; 455/427, 428, 432, 456, 457, 12.1, 517

[56] References Cited

U.S. PATENT DOCUMENTS

| | | | |
|---|---|---|---|
| 4,979,170 | 12/1990 | Gilhousen et al. | 455/422 |
| 5,017,926 | 5/1991 | Ames et al. | 342/353 |
| 5,065,398 | 11/1991 | Takashima | 370/349 |
| 5,216,427 | 6/1993 | Yan et al. | 370/349 |
| 5,347,274 | 9/1994 | Hassett | 340/988 |
| 5,430,732 | 7/1995 | Lee et al. | 370/346 |
| 5,526,357 | 6/1996 | Jandrell | 370/95.2 |
| 5,588,005 | 12/1996 | Ali et al. | 370/346 |
| 5,621,735 | 4/1997 | Rochester, Jr. et al. | 370/346 |
| 5,633,875 | 5/1997 | Hershey et al. | 370/346 |

FOREIGN PATENT DOCUMENTS

| | | |
|---|---|---|
| 9526510 | 10/1995 | WIPO . |
| 9627513 | 9/1996 | WIPO . |

OTHER PUBLICATIONS

Raven P. et al., "Radio Aided Satellite Navigation Technique", *EBU Technical Review*, Mar. 1, 1996, pp. 27–32.

*Primary Examiner*—Ajit Patel
*Attorney, Agent, or Firm*—Philip R. Wadsworth; Thomas M. Thibault

[57] ABSTRACT

A system for communication between a fleet of vehicles and a central base station, where each of the vehicles includes one or more vehicle subsystems connected to a vehicle data link, is disclosed herein. Within each vehicle, message packets generated by vehicle subsystems are placed upon the vehicle data link. Each message packet includes header information identifying a given vehicle and subsystem thereof. The message packets are transmitted from the fleet of vehicles to the central base station, and routed within the central base station based on the header information. Control information and the like may also be transmitted by the central base station for receipt by various vehicle subsystems within selected ones of the fleet vehicles. Each message packet generated by the central base station includes header information identifying at least a particular fleet vehicle and vehicle subsystem. This allows each message packet to be retrieved by the specified vehicle subsystem by way of the vehicle data link.

31 Claims, 4 Drawing Sheets

METHOD AND APPARATUS FOR THE REMOTE MONITORING AND CONFIGURATION OF ELECTRONIC CONTROL SYSTEMS

BACKGROUND OF THE INVENTION

I. Field of the Invention

The present invention relates to communications systems employing message transmitting stations and relay stations to send messages to mobile vehicles. More specifically, the present invention relates to a novel and improved method and apparatus for utilizing such communications systems to enable remote monitoring and configuration of electronic control systems within commercial freight transportation vehicles.

II. Description of the Related Art

A need is recognized by many in the mobile vehicle environment for vehicle location and dispatch messaging capability. There are a substantial number of commercial, governmental, and private applications requiring the delivery of relatively short messages to or from a large number of geographically dispersed terminals, or mobile transceivers, often on an irregular basis. The need for message services includes, for example, aviation, navigation, commercial transportation, and message delivery services.

Other examples include the commercial trucking industry, where dispatchers wish to communicate short messages to trucks located anywhere in the continental United States, especially in rural areas. Until recently the transfer of such messages was restricted to periodic telephonic communication between drivers and a central dispatcher. However, it proved to be difficult, if not impossible, for drivers to consistently "call in" at fixed, scheduled, times since telephone services are not always readily available in many areas.

Aside from conventional telephone systems, other communication systems have attempted to address the mobile market. Radio telephone, cellular telephone, and portable radio transceivers (CB) are all capable of providing some form of communication between a mobile transceiver and a base unit. However, a number of factors have rendered these systems inadequate as message communication systems for serving a large number of widely dispersed users. For example, the lower power transmissions within each of an array of cells within cellular communication systems are prone to frequency selective fading and signal blocking. Moreover, highly mobile units such as trucks are required to frequently change channels as new cells within the cellular system are traversed. Direct communication, non-cellular radio systems have proven to be similarly disadvantageous due to frequent system overload and susceptibility to interference from other communications systems.

A communication system based on Earth orbital relay satellites has been developed in an effort to overcome these difficulties and provide for continuous delivery of messages and related control information to a large number of users over a wide geographic area. Such a satellite-based message communication system is described in, for example, U.S. Pat. No. 4,979,170, entitled ALTERNATING SEQUENTIAL HALF DUPLEX COMMUNICATION SYSTEM, which is assigned to the assignee of the present invention and which is herein incorporated by reference.

In addition to a dependence upon systems for providing messaging capability to remote mobile units, certain industries also share a requirement for reliable mobile unit location information. One industry in particular in which such information is particularly desirable is the commercial trucking industry. In the commercial trucking industry an efficient and accurate method of vehicle position determination is in demand. With ready access to vehicle location information, the trucking company home base obtains several advantages. The trucking company can keep the customer apprised of location, route and estimated payload time of arrival. The trucking company can also use vehicle location information together with empirical data on the effectiveness of routing, thereby determining the most economically efficient routing paths and procedures.

In U.S. Pat. No. 5,017,926, entitled DUAL SATELLITE NAVIGATION SYSTEM, which is assigned to the assignee of the present invention, there is disclosed a system in which the communications terminal at each mobile unit is capable of determining position in addition to providing messaging capability. The system of U.S. Pat. No. 5,017,926 relies upon the theory of trilateration in, for example, the determination of mobile vehicle position. Trilateration prescribes that if the position of three objects are known relative to each other, and the distance from each these three objects to a fourth object is known, then the three dimensional position of the fourth object can be determined within the coordinate frame which described the position of the first three objects. In the system of the U.S. Pat. No. 5,017,926, the first two of the three known positions correspond to the locations of a pair of satellites, while the third position is at the center of the Earth.

Using the satellite communication capability at each mobile terminal to provide vehicle position determination offers great advantages to the commercial trucking and related parcel delivery industries. For example, this capability obviates the need for truck drivers themselves, via telephones, to provide location reports regarding their vehicle position to the trucking company home base. These location reports are intermittent at best, because they occur only when the truck driver has reached a destination or stopover site, and require the expenditure of the driver's time to phone the trucking company home base. This method of location report also leaves room for substantial inaccuracies. For example, truck drivers may report incorrect location information either mistakenly or intentionally; or report inaccurate estimates of times of arrival and departure.

In contrast, the use of satellite communication capability at each truck enables the location trucking company home base to identify the longitude/latitude position of each truck at will, thus avoiding the disadvantages associated with intermittent location reports. For example, the down time (i.e., periods of zero revenue production) of idle trucks is minimized since the communications necessary for determining location could take place while trucks are en route. Also, inaccuracies in location reports are virtually eliminated because the trucking company home base is able to ascertain accurate truck location nearly instantaneously.

Recently, trucking and delivery vehicles have been equipped with electronic control units (ECUs) connected to a vehicle data link. Such on-board ECUs typically incorporate self-diagnostic features capable of, for example, detecting faulty engine operation and vehicle subsystem failure. Such ECU diagnostics tend to reduce maintenance costs by ensuring that each vehicle is serviced in a timely manner subsequent to detection of engine malfunction and the like. However, on-board vehicle electronic processing and memory resources have been found to lack the capacity to fully utilize the large amounts of data produced by increasingly sophisticated electronic vehicle control systems. The limited on-board processing capability of vehicle electronic control units have inhibited performance of sophisticated diagnostic procedures, and have similarly limited the execution of vehicle prognostics designed to anticipate vehicle servicing requirements.

In addition, many on-board ECUs are disposed to accumulate data relating to vehicle operation. Specifically, data is transmitted over the internal data link to an on-board recording device. However, the data accumulated by the on-board recording device is typically of utility only after it has been transferred to a home base computer for use in analysis of vehicle operation. The transfer of on-board data to the home base computer is usually accomplished by downloading the on-board data to a portable computer and physically transporting the computer to the home base. This has proven to be a cumbersome process which is also both costly and prone to error, especially within large vehicle fleets.

The operational parameters of many on-board vehicle ECUs may also be programmed so as to optimize vehicle operation. For example, the vehicle engine ECU may be set to prevent the vehicle from exceeding a maximum vehicle speed. Again, however, adjustment of ECU parameters is typically accomplished through manual connection of a specially programmed portable computer to the vehicle electronic system. This manual parameter adjustment process is similarly expensive and prone to error.

During both the accumulation of on-board operational data and the adjustment of ECU parameter settings, communication over the data link is performed by using protocols which are proprietary to the manufacturer of each ECU. The existence of multiple protocols adds cost and complexity to the system, and precludes standardized communication over the vehicle data link. Furthermore, existing proprietary protocols for communication over the vehicle data link generally do not provide for reliable verification of the identity of the devices currently connected to the link. That is, it is typically incumbent upon vehicle drivers or service personnel to manually maintain a record of various identifying information (e.g., manufacturer, model number, software version) associated with each ECU connected to the data link. Such manual verification methods are also obviously quite susceptible to human error.

SUMMARY OF THE INVENTION

Accordingly, it is an object of the present invention to provide a standardized communication path between on-board vehicle electronic control units (ECUs) and external data processing resources.

It is a further object of the present invention that conventional mobile communication systems, such as satellite-based messaging and tracking systems, be employed to implement the communication path.

It is yet another object of the present invention to provide a system in which such a communication path be used to enable off-board processing resources to perform complex diagnostic and prognostic procedures involving vehicle ECUs, thereby obviating the need for sophisticated on-board processing capability.

It is still another object of the present invention to enable a base station in radio or satellite communication with a vehicle to reliably identify devices coupled to the vehicle's data link.

It is still a further object of the present invention to provide a generalized communication protocol capable of supporting the over-the-air transfer, between the data link and an external processing resource, of information formatted in a manner unique or proprietary to a specific ECU.

It is still a further object of the present invention to provide a generalized communication protocol capable of supporting the transfer, between the data link and an on-board vehicle display, of information formatted in a manner unique or proprietary to a specific ECU.

It is still another object of the present invention to enable the operational parameters of vehicle ECUs to be monitored and/or adjusted from a base station in radio or satellite communication with the vehicle.

In summary, the present invention may be implemented in a system which includes a fleet of vehicles in communication with one or more base stations, where each of the vehicles includes one or more electronic vehicle subsystems connected to a vehicle data link. In one aspect, the present invention is directed to a method for communicating, to the base stations, information provided by the various vehicle subsystems. Within each vehicle, data packets generated by vehicle subsystems are placed upon the data link. Each data packet includes header information identifying the subsystem of the given vehicle from which it originated. When data packets are transmitted over-the-air to base stations, the header information is modified to also specify the vehicle mobile communications terminal from which the packet was transmitted.

In another aspect, the present invention is directed to a method for adjusting the operational parameters of the electronic vehicle subsystems by way of message packets received from one or more base stations. Each message packet will include header information identifying an intended recipient vehicle communications terminal, and will also specify a particular electronic vehicle subsystem. In a particular implementation, the body of each message packet may include information or instructions formatted in a manner which is unique to the particular electronic subsystem.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Introduction

The present invention provides a method and apparatus for transferring messages between the vehicle subsystems within one or more fleet vehicles and one or more central control stations managed by fleet operators or service providers. Each vehicle includes a mobile communications terminal, as well as an internal data link to which are connected the vehicle subsystems. In accordance with the invention, status information and the like generated by each vehicle subsystem is placed on the internal data link in the form of discrete message packets. Each message packet includes header information identifying at least a specific vehicle subsystem. Certain of the message packets will be transmitted by the mobile communications terminal to a network management center or like networking routing facility, from which the packets are forwarded to a central control station of a fleet operator which may be located at the fleet operator dispatch facility. Within the central control station, information is extracted from the received packets and catalogued into a database of vehicle status information.

The central control station also transmits control requests and parameter information to the mobile communications terminal of a specified vehicle for use by various vehicle subsystems therein. Each message packet generated by the central control station includes header information identifying at least a particular fleet vehicle and vehicle subsystem. This allows each message packet received by a particular mobile communications terminal to be placed upon the vehicle data link and retrieved by the specified vehicle subsystem.

II. Overview of Mobile Communication Network

Figure 1:
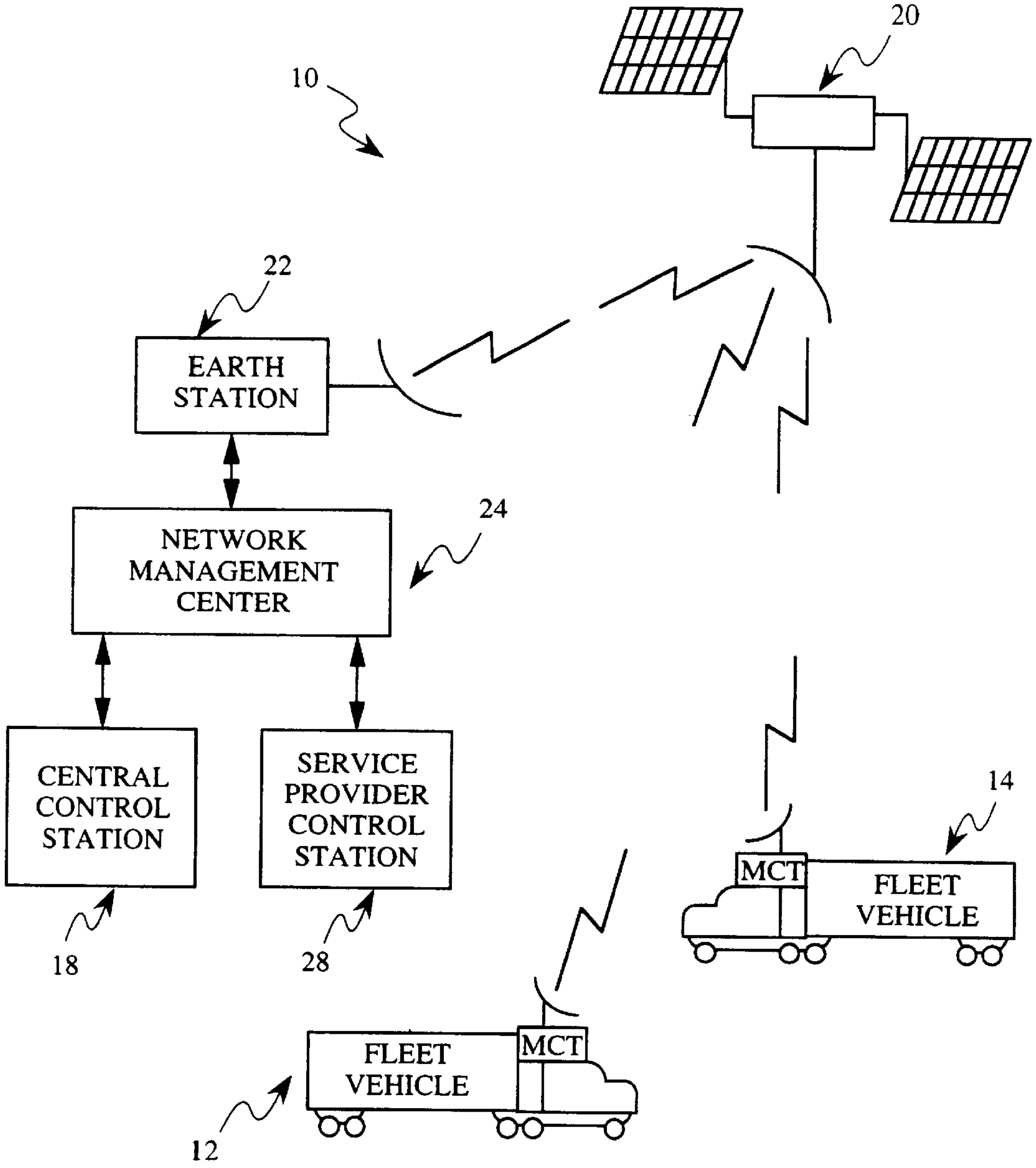
FIG. 1 depicts an exemplary implementation of a mobile communications network.

FIG. 1 depicts the components of a mobile communication network in which the present invention may be embodied. The mobile communication network may comprise, for example, a conventional cellular communication system designed to provide service between user vehicles within specified geographic areas (i.e., cells). Alternately, the present invention may be embodied within a satellite communication system of the type capable of facilitating communication between one or more central control stations and a plurality of user vehicles distributed over a wide geographic area. Such a satellite-based message communication system is described in, for example, the above-referenced U.S. Pat. No. 4,979,170.

Referring now to FIG. 1 in greater detail, an overview is provided of a communication network 10 within which message information may be exchanged between fleet vehicles 12, 14 and one or more control stations in accordance with the invention. In FIG. 1, a communication network 10 is illustrated in which the fleet vehicles 12, 14 each have a mobile communications terminal (MCT). The fleet vehicles 12, 14 are representative of any of a variety of vehicles (e.g., freight trucks) whose drivers or other occupants desire to obtain occasional or updated information, status reports, or messages from a fleet operator central base station or central control station 18. As an example, truck drivers or other delivery personnel often have a need for ready access to messages for more efficient operation. The communication network of FIG. 1 relies upon a satellite communication link between the vehicles 12, 14 and central control station 18. However it is again noted that the teachings of the present invention are equally applicable to terrestrial cellular or mobile radio communications systems in which communication is established with one or more mobile units through a central facility and remotely located transceiver base stations.

In order to provide appropriate context for a description of the manner in which the present invention facilitates information exchange between each internal vehicle data link and the central control station 18, a brief description is first provided of the usual manner in which messages are transferred between vehicle drivers and control stations.

III. Network Message Transfer

Referring now to FIG. 1 in greater detail, messages from the mobile communications terminals of the vehicles 12, 14 are transmitted to the satellite 20 and relayed thereby to a central terminal 22 which may also be referred to as an Earth station. The central terminal or Earth station 22 can be placed at a location proximate the central control station 18 allowing lower site costs and local, direct access to transmission equipment for maintenance and system upgrade. Alternatively, the Earth station 22 is located in a remote location more ideally suited for low interference ground-to-satellite transmission or reception. In this case, a telephonic, optical or satellite communication link is utilized to establish communication either directly between the Earth station 22 and the central control station 18, or alternately between the Earth station 22 and central control station 18 by way of a network management center (NMC) 24. When messaging is to take place not only between the vehicles 12, 14 and the central control station 18, but also between the vehicles 12, 14 and one or more service provider base stations or service provider control stations 28, the NMC 24 enables more efficient control over the priority, access, accounting, and transfer characteristics of message data. Additional details of the communication hardware utilized in an exemplary implementation of the Earth station 22 and NMC 24 are described in the aforementioned U.S. Pat. No. 4,979,170.

Messages, or message data, for transmission to the mobile communications terminal of each vehicle are transferred into the Earth station 22 from the central control station 18. Such messages can be provided to the Earth station 22 directly as digital data, or alternately are keyed in by system operators to form the desired message signals. Each message signal can be subjected to a variety of conventional coding, encryption, or error detection and correction schemes prior to transmission. Within the Earth station 22 encoded message symbols are used to modulate a frequency generator or source such as a direct digital synthesizer which creates an FM modulated carrier, at a preselected frequency, which is up-converted to the desired EHF band for transmission to the satellite 20.

To decrease interference and accommodate a large number of mobile communications terminals at potentially different burst rates, in the preferred embodiment a Time Division Multiplexed (TDM) transmission scheme is used. Messages or message signals transmitted within the network 10 are allocated TDM time slots (i.e., channels) of predetermined length. The allocated time slots or channels are of very short duration, and their interleaving across successive frames is made to be very large in order that communication appear to be simultaneous to each mobile communications terminal. Methods and apparatus for generating, transmitting and controlling TDM signals are well known in the communication art and can be accomplished using a variety of signal multiplexing and control devices.

Each frame consists of a number of channels which represent substantially identical, sub-frame length periods during which symbols are transferred. This means that messages or message signals are transferred a few bits at a time during each successive frame until the message is completed. Information is generally sent over the communication channels in discrete packets ranging in length from, for example, 4 to 256 characters. Each packet is generally segmented into fields of information such as the type of message, the length of the message, and the checksum bits. In addition, each message is typically preceded by a header which includes an individual serial number specifying a single mobile communications terminal, a group address identifying a set of mobile communications terminals, or an all-call address corresponding to all of the mobile communications terminals within the system. By providing these alternate addresses to which a mobile communications terminal can respond, it is possible to efficiently transfer single messages to designated groups of mobile communications terminals.

At each mobile communications terminal a transceiver is employed to receive and demodulate communication downlink signals received from the satellite 20. The downlink signals are received by an antenna and transferred through a diplexer into a demodulator (each not shown) for demodulation. The demodulator employs elements known in the art for down-converting the received communication signal to a lower IF frequency level, and then to a symbol frequency level as an encoded symbol stream (i.e., digital message). The digital message may be provided to a vehicle operator using a display device such as, for example, an LED, LCD, electroluminescent or discharge type element character display. Alternatively, the message may be interfaced to other processing elements, such as a portable computer, or printed out by a hard copy device such as a small thermal printer.

IV. Communication with Vehicle Subsystems

In accordance with the invention, each mobile communications terminal is connected to the internal data link of the vehicle upon which it is mounted in order to serve as a conduit for transferring information from designated data packets between the internal vehicle data link and the network management center (NMC). The header information of each such message is modified to include, in addition to an MCT serial number, a vehicle subsystem message identifier (MID) associated with a particular vehicle subsystem of the vehicle upon which the mobile communications terminal is mounted. Exemplary vehicle subsystems include the vehicle engine, braking system, electronic ignition system, and the like. In this way specified message packets received by the mobile communications terminal from a control station via the NMC 24 are placed upon the internal vehicle data link and retrieved by the appropriate vehicle subsystem. Similarly, the header information from data packets generated by vehicle subsystems are generated so as to include the corresponding subsystem MID, as well as the serial number of the mobile communications terminal to which the subsystem is connected via the internal vehicle data link. In this way the subsystem message may be identified by the recipient control station as being generated by a particular vehicle subsystem. It is a feature of the present invention that this bidirectional message transfer between selected vehicle subsystems and the control station may be effected using existing communication hardware, and requires no intervention by the vehicle driver.

Figure 2:
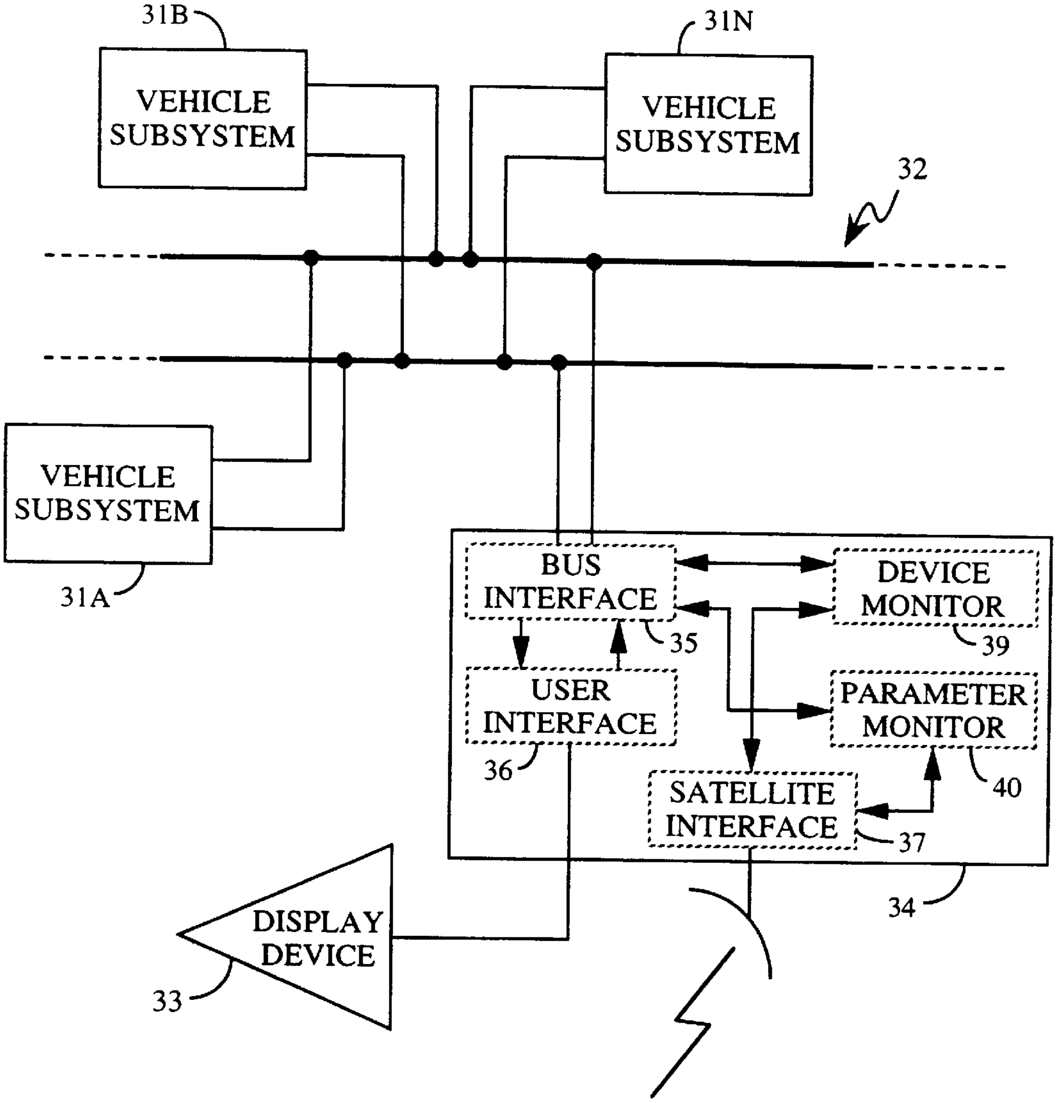
FIG. 2 schematically represents a vehicle data link included within a particular fleet vehicle.

Turning now to FIG. 2, there is schematically represented a vehicle data link 32 of the first vehicle 12. Connected to the data link 32 are a mobile communications terminal (MCT) 34, and a plurality of vehicle subsystems 31A–31N each controlled by a vehicle electronic control unit (ECU) therein, the ECU not shown. In a preferred embodiment information is conveyed over the data link 32 in accordance with standards for vehicle data links promulgated by the Society of Automotive Engineers (i.e., SAE J1587 and SAE J1708), it being understood that other physical data links and/or protocols may be employed without departing from the scope of the present invention. The SAE J1708 and SAE J1587 standards respectively specify the physical structure of a standard data link, as well as the messaging protocol employed in communication over the data link.

In accordance with SAE J1587, information is transferred using short information packets of a variety of types. Each packet incorporates a field specifying the originating ECU's MID, a field specifying data type, and a field relating to error detection. The content of the body of nearly all such messages is fully specified, according to data type, by SAE J1587. In addition, the SAE J1587 protocol provides for data types allowing for connection mode transfer of free-formatted data. As is described herein, the present invention makes use of a variety of data packets defined by the J1587 specification.

V. Device Information Monitoring

In the present system, identification of devices on the data link is effected using standard interrogative requests specified by SAE J1587. Alternately, communications protocols unique to each vehicle ECU may be employed by the MCT during the process of acquiring identifying information from those of the vehicle ECUs enabled for communication with the MCT. In an exemplary implementation, the fleet operator central control station designates vehicle subsystems for device identification via the satellite interface 37. Following each engine activation (e.g., engine start or ignition) or other predefined event, the device monitor 39 queries each designated subsystem via the bus interface 35 for identification information relating to its software and component parameters. The device monitor 39 stores this identification information within a database, a portion of which is replicated within the central control station by way of the satellite interface 37. TABLE I below specifies the fields included within an exemplary record stored within the database of the device monitor 39.

TABLE I

| |
|---|
| Component (MID) |
| VMRS |
| Model Number |
| Serial Number |
| Software Version Number |

Referring to TABLE I, a message identifier (MID) uniquely associated with a given subsystem is stored within the Component field. Within the VMRS field, an alphabetical entry is used to identify the manufacturer of the subsystem or component specified in the Component field. In addition, the manufacturer's model number of the component is stored in the Model Number field. Finally, the Serial Number of the ECU of the specified component, and the software version utilized within this ECU, are identified within the Serial Number and Software Version Number fields, respectively. In an exemplary embodiment, the MCT provides selected information stored within the database of the device monitor 39 to the central and other control stations by way of the network management center (NMC) 24.

In the exemplary embodiment, MCT 34 verifies the identity of the hardware and software of the vehicle ECUs on the vehicle 12 at predetermined times or intervals, for example at start up. This procedure ensures that "mismatches" cannot occur in messages sent between central control station 18 and vehicle 12. In the exemplary embodiment, device monitor 39 queries vehicle subsystems 31A–31N by sending a query message on vehicle data link 32. In the exemplary embodiment, vehicle subsystems 31A–31N respond to the query by providing the information designated in TABLE I. Vehicle subsystems 31A–31N respond by providing the response information on vehicle data link 32.

In addition, when MCT 34 detects a change in the identity of vehicle subsystems 31A–31N vehicle 12 transmits a message indicating the change in the identity of the vehicle subsystems 31A–31N to central control station 18. This allows central control station 18 to verify the identity of the vehicle subsystems 31A–31N which are targeted for inquiry. In the exemplary embodiment, the transmission of this information is provided when engaging in data transfer with vehicle 12.

In a preferred embodiment, the identity of vehicle subsystems 31A–31N, which are allowed to transfer data to central control station 18 are configurable by messaging from either central control station 18 or service provider control station 28. This subsystem configuration data is transmitted to vehicle 12 as described above. In response to the subsystem configuration data, MCT 34 sends a configuration message to vehicle subsystems 31A–31N on vehicle data link 32. The subsystem of vehicle subsystems 31A–31N which is to be reconfigured, receives the message and in response alters its configuration.

VI. Free-Formatted Data Transfer

In order to facilitate the exchange of ECU-specific or proprietary information between an ECU and an external control station processing resource, the present invention contemplates use of the J1587 free-formatted information transfer protocol. Specifically, forward message packets comprised of free-formatted data may be sent, via the NMC, to a vehicle's MCT and relayed to an identified ECU via the vehicle's data link. Such forward message packets may include, for example, parameter settings or other information of like type used by an ECU during control of a given subsystem. Similarly, ECUs coupled to the data link may send free-formatted packets to the MCT for transmission, via the NMC, to one or more control stations. As is described below, the central control station is adapted to send message packets to particular vehicles identifying those types of ECUs coupled to the vehicle's data link for which such free-formatted message transfer is authorized.

Referring to FIG. 2, upon reception by the satellite interface 37 of a message packet enabling a particular ECU to engage in free-formatted packet communication, the satellite interface signals the device monitor 39 to maintain a current record of information identifying the particular ECU within an ECU identification database internal to the device monitor 39. As described above, all or part of each identification record maintained by the device monitor 39 may be replicated in a corresponding ECU identification database within the central control station. As is explained below, the maintenance of these databases of ECU identification information facilitates verification that the information within each free-formatted message packet is of a format consistent with the types of ECUs to which it is addressed.

This feature of the invention may be appreciated by considering the case in which the MCT of a vehicle receives message packets from one or more control stations, each message packet containing free-formatted information and header information specifying the identity of an ECU within the vehicle. In addition, the header information of each free-formatted message packet will typically include identifying information of the type included within TABLE I. The device monitor 39 compares the header information of a received message packet to the identification information within a corresponding record of the ECU identification database therein. Message packets having header information consistent with that stored within the ECU identification database of the device monitor 39 are transmitted over the vehicle data link via the bus interface 35 to the identified ECU. If the header information of a message packet does not match that stored within the ECU identification database internal to the device monitor 39, an error message is transmitted via satellite interface 37 to the control station from which the message packet originated. Accordingly, each vehicle ECU is precluded from receiving information formatted in a manner potentially inconsistent with its required message protocols and the like.

Those ECUs connected to the vehicle data link which have been authorized for message transfer by the device monitor 39 of the vehicle MCT may also be authorized to transmit message packets to one or more control stations. Messages are transmitted over the vehicle data link from an authorized ECU to the vehicle MCT in the form of, for example, J1587 free-formatted message packets. In turn, the satellite interface 37 of the vehicle MCT transmits the free-formatted data inherent within the message packets to one or more control stations. The header information of these free-formatted packets typically includes the MID of the ECU from which the packet originated. In addition, the header information may also include information relating to the routing of the packet to specific control stations. In this regard the central control station may place constraints, transmitted to and stored within the device monitor 39, relating to the type of ECUs which may transmit free-formatted information to particular control stations. For example, by providing a "routing VMRS" to the device monitor 39 the central control station may specify that vehicle ECUs of a particular MID may transmit free-formatted information only to those control stations associated with the manufacturers identified by a corresponding VMRS value. The device monitor 39 facilitates compliance with this constraint by verifying that the VMRS field of the ECU sending the message matches the routing VMRS (i.e., the actual manufacturer of the ECU) associated with the MID of the ECU. In this way it is ensured that message packets from the ECUs of a given manufacturer are routed to the control station or processing facility associated with the manufacturer. After such message packets are transmitted by the MCT 34 via satellite 20 and Earth station 22 to the NMC 24, NMC 24 routes the transmitted message packets to the appropriate control station using the MID and routing VMRS fields within the message packet header.

Although the foregoing indicates that a control station may authorize, for example, via an over-the-air communication, a vehicle MCT to send and receive message packets associated with a particular ECU, it should be understood that other methods of authorization are within the scope of the present invention. For example, the MCT may be configured to locally receive authorization, via user interface 36, for transmission/reception of free-formatted message packets associated with a given ECU.

Figure 3:
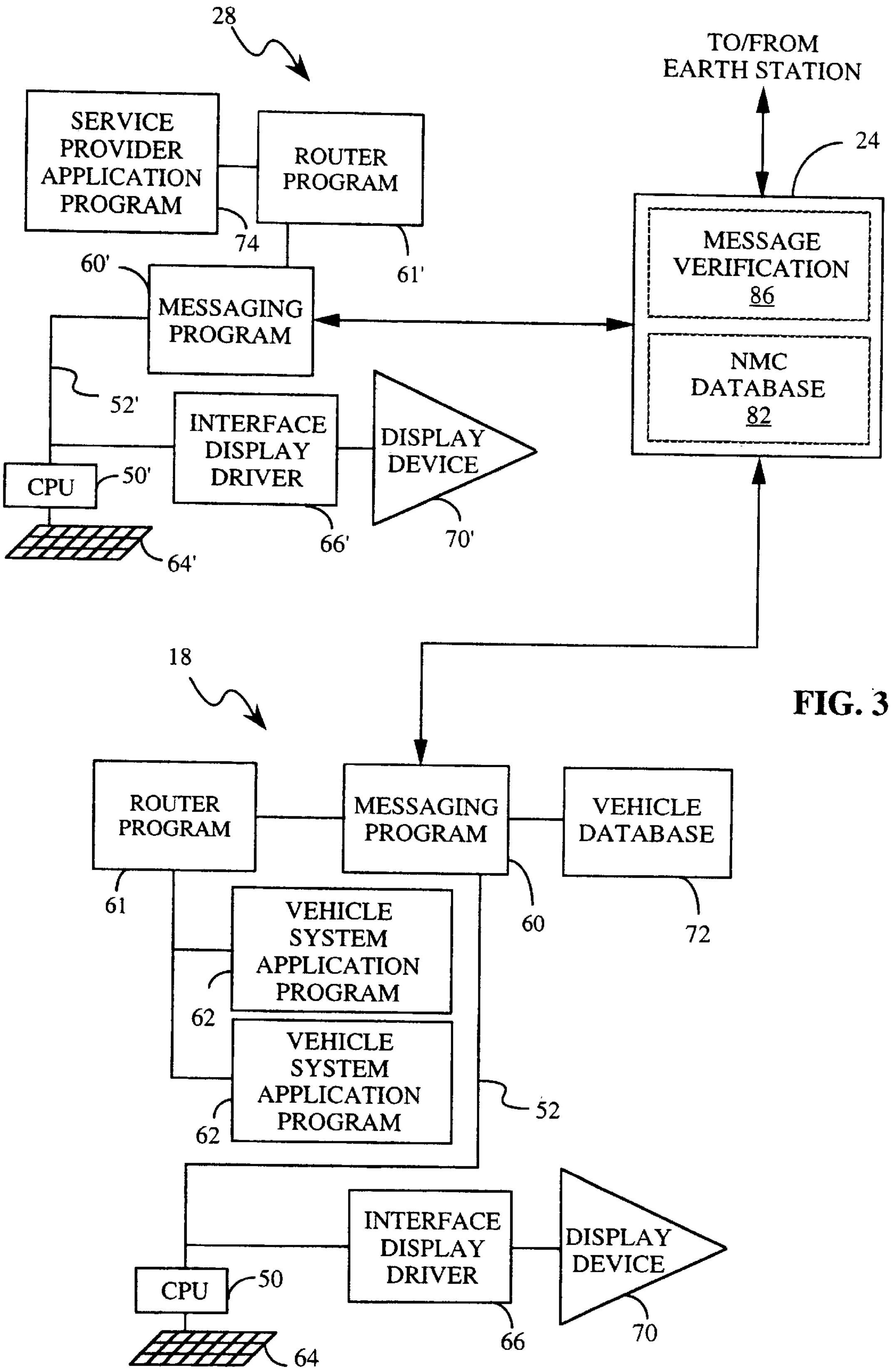
FIG. 3 shows a more detailed representation of the structure and organization of central and service provider control stations included within a mobile communications network.

Referring to FIG. 3, there is shown a more detailed representation of the structure and organization of the central control station 18 and of the service provider control station 28. As is indicated by FIG. 3, the NMC 24 is connected through telephone lines or dedicated fiber optic cables to the central and service provider control stations 18, 28. The central control station 18 is seen to include a general purpose computer system (e.g., an IBM AS/400) having a central processing unit (CPU) 50 that is interconnected by a system bus 52 to a primary memory module in which are stored a messaging program 60, a router program 61, and one or more vehicle system application programs 62. The CPU 50 is also connected to a keyboard 64, as well as to an interface display driver 66 in combination with a display device 70.

The messaging program 60 sends the free-formatted message packets originating within various vehicle subsystems to the router program 61, and transfers other types of control messages and information received from the NMC 24 to the system bus 52. The messaging program 60 may be implemented using software such as the QTRACS/400 program available from QUALCOMM Incorporated of San Diego, Calif. Based on the vehicle subsystem MID included within the header information accompanying each message packet, the router program 61 relays each received message packet to one or more vehicle system application programs 62. The vehicle system application program(s) 62 will typically be designed to, for example, monitor vehicle subsystem performance, maintain statistics related to vehicle subsystem operation, and forecast vehicle service requirements.

Referring to FIG. 3, a vehicle database 72 maintained within the central control station 18 includes a record of the types of ECUs utilized within the vehicle associated with each mobile communications terminal. In an exemplary embodiment the vehicle database 72 is formed by replicating, within the central control station 18, at least the portion of the database within each mobile communications terminal specifying the MCT serial number and the identifying information for the ECUs contained within the vehicle upon which is mounted the mobile communications terminal. The existence of the vehicle database 72 and/or the database within each mobile communications terminal advantageously prevents parameter or control information of incorrect format from being provided to or from a given ECU.

Specifically, the messaging program 60 can operate to verify that the header information of each message packet intended for receipt by an ECU agrees with the corresponding information stored within the vehicle database 72. The messaging program 60 accomplishes this by comparing the ECU information specified within the packet header to the ECU information stored within the record of the vehicle database 72 associated with the mobile communications terminal specified by the packet header. If the ECU information specified within the packet header does not agree with the identifying information for that ECU type within the database record, an error message is generated and the message packet is not sent.

As is indicated by FIG. 3, the service provider control station 28 is organized similarly to the central control station 18. Accordingly, primed reference numerals have been used to identify elements within the service provider control station 28 substantially similar to those within the central control station 18. Disposed within the service provider control station 28 is a general purpose computer system (e.g., an IBM AS/400) having memory in which is stored a messaging program 60', a router program 61', and one or more service provider application program(s) 74. Each service provider application program 74 is enabled for operation by the central control station 18, and serves to monitor and/or update parameters of those vehicle subsystems of a particular type. For example, an exemplary service provider application program 74 may operate to set the engine parameters within certain ones of the fleet vehicles produced by a particular engine manufacturer. Similarly, another service provider application program may be responsible for monitoring the performance of braking systems from a given manufacturer used within a given set of fleet vehicles. Exemplary formats for packet header information to accompany message packets generated by service provider application program(s) 74 are described in further detail below.

In accordance with one aspect of the invention, these operations are facilitated by allowing free-formatted data packets to be routed to computers in service provider control stations by incorporating identifying information within the packets. In particular, free-formatted data packets are routed to the appropriate service provider computer by matching device and manufacturer information within the data packet to a particular service provider. In the preferred embodiment, the central control station computer specifies this optional routing operation for data packets associated with a specified set of the devices connected to each vehicle MCT. Specifically, the central control station computer sends the MCT a list of the set of devices selected for the optional packet routing procedure, and also sends the appropriate VMRS routing codes for each device. In turn, the MCT incorporates the appropriate routing information in the packet headers of messages originating from the selected devices. After being transmitted by the MCT, these packets are routed by the NMC 24 to appropriate service provider control stations in accordance with the packet header information of each. Alternately, the NMC may maintain a separate database of routing information and thereby obviate the need for routing information to be provided in the packet header.

In an exemplary implementation, the computers within both central and service provider control stations execute a log-on sequence upon becoming connected to the NMC. The NMC is configured in the exemplary implementation to distinguish between various service provider and control station computers by examining certain account information used in the log-on sequence. Service provider accounts may be associated with one or more MID/VMRS pairs, each of which is associated with a particular device ID and manufacturer. In this regard the NMC maintains a database of the various MID/VMRS pairs associated with each service provider account number. When the above-described optional packet routing is selected, the NMC routes return data packets received from vehicle subsystems to the service provider computer corresponding to the MID and VMRS fields specified within the header of the return packet. Similarly, only those forward packets with MID and VMRS header information matching the service provider computer from which the forward packet originated are allowed by the NMC to be sent to the indicated vehicle subsystem. In an alternate approach, the NMC is specifically configured to retain authorization information identifying a predefined set of vehicle MCT's which may be sent forward packets from a given service provider computer.

Referring now to TABLE II, a data record included within the vehicle database 72 stored within the central control station 18 is seen to include an exemplary set of six data fields. In particular, the Vehicle ID field will typically include an alphanumeric entry representative of a specific vehicle within a given vehicle fleet. Since in an exemplary implementation the header of message packets sent and received by the messaging program includes an MCT Serial # rather than a Vehicle ID, a separate table listing the Vehicle ID associated with each MCT Serial # will typically also be maintained within the vehicle database 72. Accordingly, the terms MCT Serial # and Vehicle ID, may be used interchangeably hereinafter. Each of the remaining fields in TABLE II correspond to a field within TABLE I of the same name.

TABLE II

| Vehicle ID | Component (MID) | VMRS | Model Number | Serial Number | Software Version Number |
|---|---|---|---|---|---|

Referring now to TABLES III, IV and V, there are shown data records of the type which may be included within data tables stored within the NMC database 82 of the network management center 24. TABLE III specifies a record including a type of vehicle component (MID) and associated manufacturer (VMRS) to be monitored and/or controlled by a particular service provider (Service Provider Acct. #) from the service provider control station (FIG. 3). As an example, a particular record within TABLE III could indicate that a given service provider account (Service Provider Acct. #) would have responsibility for operation of all vehicle engines (MID) manufactured by the Detroit Diesel Co (VMRS). The NMC may also include a database of records of the type specified in TABLE IV, each of which associates a given MCT with one more MID and VMRS combinations for routing purposes. Each data record of the type shown in TABLE IV, in conjunction with information of the type included within TABLE III, allows the NMC to determine the manner in which messages originating in the ECUs of various types (i.e., of various MID/VMRS combinations) are to be routed to the processing resources associated with specific service provider accounts. Alternately, the NMC may include a database of records of the type shown in TABLE V, in which each MID for each MCT is listed as being associated with a given service provider. A database of records of the type shown in TABLE V provides flexibility in that for each MCT having multiple MIDs associated therewith that the MIDs may be administered by the same service provider or by different service providers as indicated by the records for the MCT. Thus a distinct service provider may be specified for any MID on a vehicle.

TABLE III

| Service Provider Acct. # | MID | VMRS |
|---|---|---|

TABLE IV

| MCT Serial # | MID | VMRS |
|---|---|---|

TABLE V

| MCT Serial # | MID | Service Provider Acct. # |
|---|---|---|

The data tables within the NMC database 82 primarily serve to ensure that only parameter information in the appropriate format is relayed to the specified vehicle subsystem. For example, upon receiving a message packet generated by a service provider application program 74, a message verification routine 86 within the network management center 24 will compare the header of the message packet to the appropriate record (see, e.g., TABLE III) within the NMC database 82. Only if information within the Component and VMRS fields stored within the record for the service provider (Service Provider Acct. #) match the information within corresponding fields of the packet header will the message packet be forwarded by the network management center 24 to the designated mobile communications terminal. If the information within corresponding fields does not match, the message verification routine transmits an error message to the service provider control station 28. Within the control station 28, messaging program 60' may route the error message to display device 70' in order that an operator may be alerted to the existence of the error condition.

In an exemplary embodiment the network management center 24 includes a general purpose computer through which the data tables within the NMC database 82 may be directly accessed and updated. Alternately, these tables are updated using message packets transmitted to the network management center 24 from the central control station 18 or service provider control station 28.

Figure 4:
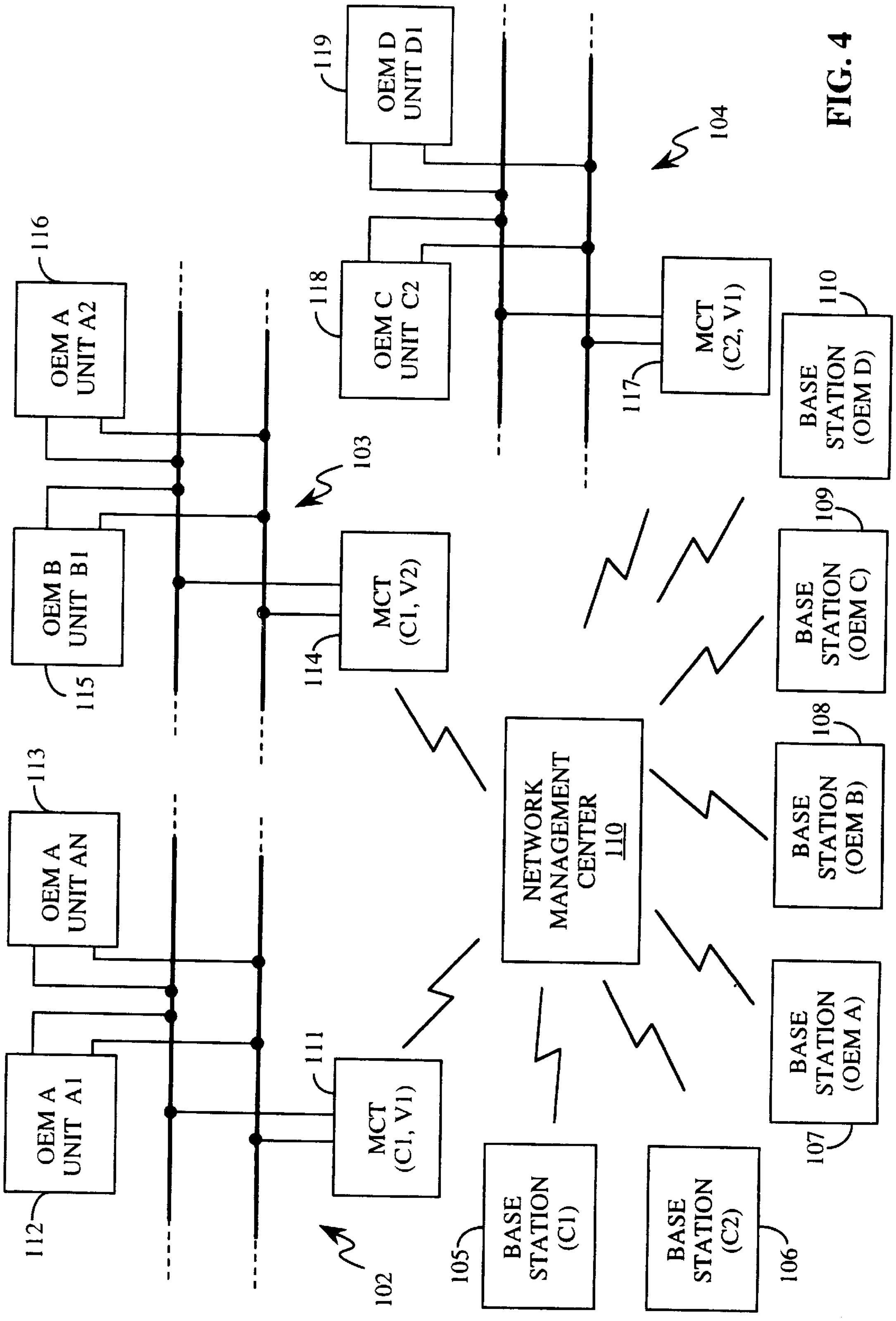
FIG. 4 illustratively represents a set of three fleet vehicles administered by fleet operator and service provider base stations.

Turning now to FIG. 4, there are illustratively represented a set of three fleet vehicles 102–104 administered by fleet operator control or base stations 105–106, as well as by service provider, i.e., original equipment manufacturer (OEM) control or base stations 107–110. A network management center (NMC) 110 and an Earth station (not shown) facilitates communication between each of the base stations and the fleet vehicles 102–104. The representation of FIG. 4 is intended to demonstrate the manner in which the communication system of the invention facilitates management and administration of a vehicle fleet by more than a single entity. Referring to FIG. 4, the vehicles 102 and 103 are seen to comprise first (V1) and second (V2) vehicles within the fleet managed by a first fleet operator (C1) through fleet operator base station 105. Vehicle 104 constitutes the first (V1) vehicle within the fleet administered by a second fleet operator (C2) through fleet operator base station 106. Even though the MCTs 111 and 114 respectively of vehicles 102 and 103 are disposed to communicate only with base station 105, and the MCT 117 of vehicle 104 communicates only with base station 106, the messaging protocol of the present invention enables separate communication to occur between the subsystems within the vehicles 102–104 and the different OEMs, OEMs A–D, through the respective OEM base stations 107–110.

More specifically, vehicle 102 includes an MCT 111 and two vehicle subsystems 112–113. In vehicle 102, subsystem 112 is a type unit A1 (e.g., an engine) manufactured by OEM A, which is assumed to operate in conjunction with OEM A base station 107. Vehicle 102 also includes a subsystem 113 which is a type unit AN (e.g., a brake system) also manufactured by OEM A. Similarly, vehicle 103 may include a subsystem 116 which is a type of engine (unit A2) also produced by OEM A. By sending message packets identified by header information in the above-described format, OEM A base station 107 may send requests via NMC 110 to the MCTs 111 and 114 of vehicles 102 and 103 that various modifications or adjustments be made to the parameter settings of one or more of subsystems 112 (unit A1), 113 (unit AN) and 116 (unit A2). In a converse communication operation, the current configuration or parameter settings of subsystems 112 (unit A1), 113 (unit AN) and 116 (unit A2) are reported to OEM base station A via message packets transmitted in the reverse direction through NMC 110. Similarly, OEM B base station 108 may send requests via NMC 110 to the MCTs 111 and 114 of vehicles 102 and 103 that various modifications or adjustments be made to the parameter settings of subsystems 112 (unit A1). Similar messaging may occur between, for example, OEM C and D base stations 109 and 110 and the respective subsystems 118 and 119 (units C2 and D1), respectively, within vehicle 104 via MCT 117 and NMC 110.

V. Free-Formatted Data Display

The system of the invention utilizes the free-formatted information transfer characteristic of the J1587 protocol to facilitate transmission of ECU-specific or proprietary information to an external display associated with an MCT. In particular, the central base station is operative to transmit message packets to the MCTs of selected vehicles identifying which of the ECUs connected to each vehicle's data link are authorized to use the display device 33 (FIG. 2) of the vehicle's MCT. The MCT of each vehicle receives free-formatted data via the bus interface 35 from authorized ECUs, and transmits the data via the user interface 36 to the external display device 33. The display device 33 allows a vehicle driver or other user to view proprietary information received from the ECU of a given device coupled to the data link.

Although the central base station may authorize, for example, via an over-the-air communication, a vehicle MCT to enable its display device to be used for display of information within message packets from specified ECUs, it should be understood that other methods of authorization are within the scope of the present invention. For example, the vehicle MCT may be configured to locally receive authorization, via user interface 36, to display information within packets from particular ECUs. It should also be understood that the displayed information may constitute only a subset of that transmitted to the base station. For example, it is unnecessary to display subsystem identification information or vehicle identification information at the vehicle itself, but such information is typically included within transmitted message packets. Furthermore, the displayed information may be different from that which is transmitted. For example the transmitted information may comprise event log data or historical data, typically in binary form, while the displayed information may be advisory in nature, typically in a readable form such as ASCII text, which may or may not be related to the transmitted information.

VI. Vehicle Parameter Monitoring

As discussed above, the system of the invention allows the parameters associated with devices coupled to vehicle data links to be monitored using the interrogative requests specified by SAE J1587. Alternately, each vehicle MCT may be configured to use communication protocols unique to the ECU of each vehicle device during the monitoring process. In either implementation, the central base station will typically designate those vehicle devices and subsystems to be monitored by way of a message received by the satellite interface 37. Upon the occurrence of a predefined event (e.g., engine start), the parameter monitor 40 queries each designated subsystem or device coupled to the data link as to the current state(s) or value(s) of the parameter(s) to be monitored. A parameter database of the monitored parameters is maintained within the parameter monitor 40, and through communication with the central base station via satellite interface 37 allows for all or part of the parameter database to be replicated therein. TABLE VI provides a representation of an exemplary 3-field record of a type typically included within the parameter database.

TABLE VI

| Component (MID) | Parameter Identifier | Current Parameter Value |
|---|---|---|

Referring to TABLE VI, the unique message identifier associated with a given ECU is stored within the Component field. The Parameter Identifier field specifies the parameter associated with the specified MID which is to be monitored, and typically holds a parameter identification character (PID) specified by SAE J1587. In addition, the Current Parameter Value field stores the last reported value of the parameter specified in the Parameter Identifier field. In the exemplary embodiment, following each update of the Current Parameter Value the MCT sends (via the NMC 24) message packet(s) to one or more base station(s) indicating its most current value.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for remotely monitoring and configuring a vehicle subsystem located on a vehicle, said vehicle subsystem being connected to a vehicle data link, said vehicle being one of a fleet of vehicles in communication with a central base station, comprising the steps of:

providing, within said vehicle, a message packet including status information produced by a vehicle subsystem within said vehicle, said message packet further including header information identifying said vehicle and said vehicle subsystem;

transmitting said message packet from said vehicle to said central base station; and directing said message packet to a specific vehicle subsystem application program at said central base station as a function of said header information identifying said vehicle subsystem for monitoring and configuring said vehicle subsystem.

2. The method of claim 1 wherein said step of transmitting includes the step of transmitting said message packet to a network management center, and relaying said first message packet from said network management center to said central base station based on said header information.

3. The method of claim 2 further including the steps of:

generating, within said vehicle, a second message packet including header information identifying at least said vehicle;

transmitting said second message packet from said vehicle to said network management center; and relaying said second message packet from said network management center to a service provider base station based on said header information within said second message packet.

4. A method for remotely monitoring and configuring a vehicle subsystem located on a vehicle, said vehicle subsystem being connected to a vehicle data link, said vehicle being one of a fleet of vehicles in communication with a central base station, comprising the steps of:

generating, at said central base station, a message packet for receipt by a vehicle subsystem within said vehicle, said message packet including header information identifying said vehicle and said vehicle subsystem;

transmitting said message packet from said central base station to said vehicle;

comparing said header information of said message packet to corresponding vehicle subsystem identifying information stored within a database located onboard said vehicle; and placing said message packet upon said vehicle data link if said header information agrees with said corresponding vehicle subsystem identifying information within said database for directing said message packet to said vehicle subsystem identified by said vehicle subsystem identifying information.

5. The method of claim 4 further including the step of transmitting an error message from said vehicle to said central base station if said information within said first message packet does not agree with said corresponding vehicle subsystem identifying information within said database.

6. The method of claim 4 further including the step of maintaining a replica of said database within said central base station.

7. The method of claim 4 further including the step of updating said database at predefined times by querying said vehicle subsystems within said first vehicle.

8. The method of claim 7 wherein one of said predefined times is an engine start.

9. The method of claim 7 further including the step of maintaining a replica of said database within said central base station, and updating said replica of said database at said central base station upon receiving update information from said mobile communications terminal.

10. A communication network for remotely monitoring and configuring a vehicle subsystem located on a vehicle, said vehicle subsystem being connected to a vehicle data link, said vehicle being one of a fleet of vehicles in communications with a central base station, said communication network comprising:

means for placing message packets upon the vehicle data link of said vehicle, said message packets indicating the status of at least one vehicle subsystem within said vehicle wherein each of said message packets includes header information identifying at least one vehicle subsystem;

a mobile communications terminal, connected to the vehicle data link of said vehicle, for transmitting said message packets from said vehicle to said central base station; and means for routing said message packets to vehicle subsystem application programs within said central base station as a function of said vehicle subsystem identifying information contained in said header information.

11. The communications network of claim 10 wherein said means for routing message packets comprises a router program located within said central base station.

12. The communications network of claim 10 further including a network management center operable to receiver received said message packets transmitted by said mobile communications terminal, said network management center being operative to relay said message packets to said central base station based on said header information.

13. The communications network of claim 12 wherein said network management center includes means for relaying said message packets transmitted by said mobile communications terminal to a service provider base station in accordance with header information within said message packets.

14. A communication network for remotely monitoring and configuring a vehicle subsystem located on a vehicle, said vehicle subsystem being connected to a vehicle data link, said vehicle being one of a fleet of vehicles in communications with a central base station, said communication network comprising:

a message program, resident within said central base station, for generating a message packet for receipt by a vehicle subsystem within said vehicle, said message packet including header information identifying said vehicle and said vehicle subsystem;

a mobile communication terminal, disposed at said vehicle, for receiving said message packet wherein said message packet is retrievable by said vehicle subsystem from the vehicle data link;

a database located within said mobile communications terminal containing vehicle subsystem identifying information corresponding to said vehicle subsystem; and a comparator module located within said mobile communications terminal for comparing said header information of said message packet to corresponding vehicle subsystem identifying information within said database and placing said message packet upon said vehicle data link if said header information agrees with said corresponding vehicle subsystem identifying information with said database for directing said message packet to said vehicle subsystem identified by said vehicle subsystem identifying information.

15. The communications network of claim 14 wherein said mobile communications terminal further transmits an error message from said vehicle to said central base station if said information within said message packet does not agree with said corresponding vehicle subsystem identifying information within said database.

16. The communications network of claim 14 wherein said central base station comprises a second database, said second database containing said vehicle subsystem identifying information for each vehicle in said fleet of vehicles.

17. The communications network of claim 14 wherein said mobile communications terminal updates first database at predefined times by querying said vehicle subsystems within said vehicle.

18. The communications network of claim 17 wherein said predefined times correspond to engine activation times of said vehicle.

19. The communications network of claim 14 further comprising a controller for updating said second database upon receiving update information from said mobile communications terminal.

20. The method of claim 1 further including the step of transmitting authorization information from said central base station to said vehicle wherein said authorization information specifies one or more vehicle subsystems which are authorized to transmit and receive message packets.

21. The method of claim 1 further including the step of displaying information from said first message packet on a display device at said vehicles.

22. The method of claim 1 further including the steps of:

transmitting routing information from said central base station to said vehicle specifying a service provider base station associated with said vehicle subsystems; and transmitting a second message packet generated by said vehicle subsystem to said service provider base station.

23. The method of claim 22 further including the step of determining whether a predefined correspondence exists between said vehicle subsystem and said service provider base station, and inhibiting transmission of said second message packet if said predefined correspondence does not exist.

24. The method of claim 1 further including the step of storing, in a network management center in communication with each of said vehicles and with at least one service provider base station, message packet routing information specifying where message packets are to be routed.

25. The method of claim 1 further including the step of displaying information from said first message packet on a display device at said vehicle.

26. The communications network of claim 10 further including means for displaying information from said message packets at said vehicle.

27. The communications network of claim 26 wherein said mobile communications terminal is further for receiving, from said central base station, authorization information which specifies which of vehicle subsystem of said vehicle is authorized to use said display means.

28. The method of claim 1 further comprising the step of transmitting, from said central base station, authorization information to said vehicle wherein said authorization information allows said status information to be displayed.

29. The method of claim 1 further comprising the step of receiving authorization information via a user interface located in said vehicle, said authorization information specifying at least one vehicle subsystem which may transmit and receive message packets.

30. The method of claim 1 further including the step of receiving authorization information via a user interface, specifying at least one vehicle subsystem allowed to display said status information at said vehicle.

31. The method of claim 1 further comprising the step of verifying the identity of said vehicle subsystem.

* * * * *